United States Patent
Pejhan et al.

(10) Patent No.: US 8,588,272 B1
(45) Date of Patent: Nov. 19, 2013

(54) MANAGEMENT AND SELECTION OF REFERENCE FRAMES FOR LONG TERM PREDICTION IN MOTION ESTIMATION

(75) Inventors: Sassan Pejhan, Princeton, NJ (US); Andrew Krupiczka, Middletown, CT (US)

(73) Assignee: VBrick Systems, Inc., Wallingford, CT (US)

( * ) Notice: Subject to any disclaimer, the term of this patent is extended or adjusted under 35 U.S.C. 154(b) by 0 days.

(21) Appl. No.: 13/556,941

(22) Filed: Jul. 24, 2012

Related U.S. Application Data

(63) Continuation of application No. 11/331,665, filed on Jan. 13, 2006, now Pat. No. 8,265,145.

(51) Int. Cl.
- *H04B 1/00* (2006.01)
- *G06K 9/00* (2006.01)
- *G01J 1/20* (2006.01)

(52) U.S. Cl.
USPC .................. 375/142; 382/100; 250/201.9

(58) Field of Classification Search
USPC .......................... 375/142; 382/100
See application file for complete search history.

(56) References Cited

U.S. PATENT DOCUMENTS

| | | | |
|---|---|---|---|
| 5,396,165 A * | 3/1995 | Hwang et al. | 323/210 |
| 5,999,561 A * | 12/1999 | Naden et al. | 375/142 |
| 6,925,108 B1 * | 8/2005 | Miller et al. | 375/150 |
| 7,130,443 B1 * | 10/2006 | Werner et al. | 382/100 |
| 7,346,226 B2 * | 3/2008 | Shyshkin | 382/275 |
| 7,492,820 B2 * | 2/2009 | Puri | 375/240.03 |
| 7,869,503 B2 * | 1/2011 | Haskell et al. | 375/240.03 |
| 8,045,660 B1 * | 10/2011 | Gupta | 375/350 |
| 8,058,598 B2 * | 11/2011 | Sandler et al. | 250/201.9 |
| 2005/0238103 A1 * | 10/2005 | Subramaniyan et al. | 375/240.16 |
| 2006/0198439 A1 * | 9/2006 | Zhu | 375/240.03 |

* cited by examiner

*Primary Examiner* — Leon-Viet Nguyen
*Assistant Examiner* — Sarah Hassan
(74) *Attorney, Agent, or Firm* — Fenwick & West LLP

(57) ABSTRACT

Reference frames are selected for use in a frame reference buffer in a video encoding system, so as to provide long term prediction of motion in video sequences. Candidate reference frames are characterized by characteristic vectors. From the candidate reference frames, a number of reference frames are maintained in the frame buffer so as to obtain a specified distribution of the characteristic vectors over a vector space. Frames are selected for use in encoding a current frame based on the characteristic vector of the current frame and the reference frames in the frame buffer.

35 Claims, 4 Drawing Sheets

MANAGEMENT AND SELECTION OF REFERENCE FRAMES FOR LONG TERM PREDICTION IN MOTION ESTIMATION

CROSS REFERENCE TO RELATED APPLICATIONS

This application is a continuation of U.S. patent application Ser. No. 11/331,665, filed on Jan. 13, 2006, entitled "Management And Selection Of Reference Frames For Long Term Prediction In Motion Estimation". This application is related to application Ser. No. 10/789,947, filed on Feb. 27, 2004, entitled "Phase Correlation Based Motion Estimation in Hybrid Video Compression", and to U.S. patent application Ser. No. 11/265,533, filed on Nov. 1, 2005, entitled "Phase Correlation Based Motion Estimation in Hybrid Video Compression". All of the above are incorporated herein by reference in their entirety.

FIELD OF INVENTION

This invention relates in general to video compression, and more particularly to reference frame selection and motion estimation in video images.

BACKGROUND OF INVENTION

Current video compression standards such as MPEG-1/2/4 and H.26x employ a hybrid of block-based motion compensated prediction and transform coding for representing variations in picture content due to moving objects. Each video frame may be compared with one or two other previously encoded frames. These previously encoded frames are referred to as reference frames. In most standards, frames that are encoded only with respect to themselves and without reference to another frame are called Intra coded, or I frames. Predicted (P-) frames are coded with respect to the nearest preceding Intra coded (I-frame) or P-frame. Bi-directionally predicted (B-) frames use the nearest past and future I- or P-frames as reference.

In block-based motion estimation, a current frame is divided into rectangular blocks and an attempt is made to match each block with a block from a reference frame, which would serve as the predictor of the current block. The difference between this predictor block and the current block is then encoded. The (x,y) offset of the current block from the predictor block is characterized as a motion vector. A significant improvement in compression efficiency is achieved since usually the 'difference block' has a much lower energy or information content than the original block.

The new ITU H.264/MPEG-4 AVC standard extends the concept of motion compensated prediction in a number of ways. It allows blocks in a frame (or blocks therein) to be compared with several other frames (or blocks therein) Up to 16 reference frames or 32 reference fields may be used in the comparison. Moreover, the reference frames no longer have to be the nearest (past or future) I- or P-frame. The reference frames can be located anywhere in the video sequence, as long as they are encoded prior to the frames that use them as a reference. The number of reference frames that can be used to encode a frame is limited by the amount of resources (memory and CPU) available (in both the encoder and decoder), subject to the maximum cap of 16 frames imposed by the H.264 specifications.

This expanded flexibility in motion compensated prediction provided by the H.264 standard is particularly beneficial in scenes where the video content toggles between multiple cameras, or when objects in a scene follow an oscillatory motion (e.g., a person's head nodding or eyes blinking), or when an object is temporarily occluded by another one. In these situations the most appropriate reference frame for encoding a given block may not be the one immediately preceding or subsequent to the frame to be encoded, but might be several frames away—hence the notion of Long Term Prediction (LTP).

The introduction of this new flexibility introduces two new challenges for designers of H.264 and other encoders employing LTP: (1) developing a low-complexity algorithm to intelligently select the best frames that can serve as reference frames from the list of all previously encoded frames and (2) developing a low-complexity algorithm to efficiently search through the selected reference frames.

Despite the progress made in the last two decades on Fast Motion Estimation (FME) algorithms, motion estimation with a single reference frame is already the most expensive operation during video encoding in terms of both CPU and memory usage. Having several reference frames instead of one therefore significantly impacts encoder performance. As such, almost all of the research into LTP has been concentrated on the second challenge noted above—i.e. how to efficiently search through a given set of reference frames. Yet the first challenge—appropriate selection of reference frames—can have a significant impact on the effectiveness of the LTP tool for improving compression efficiency.

Current H.264 implementations employ a sliding window approach in which the N (typically N≤5) frames immediately preceding the current frame are selected as potential reference frames. This selection approach is not always an effective choice, particularly in video sequences where the frequency at which the image content changes (e.g., where the image toggles between two cameras, or where there is periodic occlusion of an object) occurs over a time frame greater than that associated with five frames (165 ms at 30 fps) or even sixteen frames (~0.5 seconds at 30 fps). In other words, this approach is insensitive to low frequency periodic motion, and cannot take advantage of content redundancy outside of the window length.

A variation of the sliding window approach is to use the N most recent frames that have a k-frame separation between them—i.e. every k frames, replace the oldest reference frame with the most recently encoded frame. Yet this approach still suffers from the fact that the reference frames are selected independently of their content, and thus may or may not be good predictors for the frame to be encoded.

Another approach is to select the N frames such that each represents a different scene or shot. This way, when the video content toggles between multiple cameras, there will be a good chance that one of the reference frames will be a good predictor for the current frame. This approach would leverage the large body of research in automatic scene and shot detection algorithms. The use of this scheme brings up several challenges. These include determining how shots or frames are classified, how reference frames are selected, dealing with single shot sequences, and distinguishing between real scene changes and large motion of objects or changes in lighting.

SUMMARY OF THE INVENTION

A video encoding method selects reference frames for encoding a current frame from a set of candidate frames. The set of candidate reference frames are selected based on a characteristic metric. The characteristic metric for a candidate frame can be encoded in a characteristic vector within a vector space. The set of candidate reference frames is selected to provide a desired degree of coverage over the range of the characteristic metric vector. For example, the candidate reference frames can be selected to provide maximum coverage of the vector space. The list of candidate reference frames can be updated each time a video frame is encoded.

In one embodiment, video frames are divided into blocks, each of which includes a number of macroblocks. A spatial or frequency transform is applied to each block to generate a set of metrics; the metrics may be the coefficients of the transform. The transform can be a 2D Fourier transform, and the metrics would then comprise the DC coefficient and a number of the AC coefficients. Each block is associated with a block characteristic vector comprising some number of the metrics resulting from the transform, such as the first M coefficients. The entire frame is then associated with a frame characteristic vector comprising all of the block vectors, for example as the vector sum of the block characteristic vectors. Characterizing the frames by a characteristic vector of metrics allows the difference between two frames to be measured by calculating an interframe distance between the characteristic vectors, such as Euclidean distance. The list of candidate reference frames is generated by selecting some number of references frames that provide a specified range of coverage or distribution over the metrics. For example, the specified distribution may be to maximize the average distance between the frame characteristic vectors of the candidate reference frames. The list of candidate reference frames is then updated periodically, for example, after each video frame is encoded.

In another aspect of the invention, a frame is encoded by selecting a reference frame from the list of candidate reference frames. The current frame to be encoded is processed to obtain its block characteristic vectors, and its frame characteristic vector. A distance between each block characteristic vector and the block characteristic vector of a co-located block in one of candidate reference frames is calculated. One or more of the candidate reference frames are selected where the co-located blocks of the candidate reference frame and the current frame have characteristic vectors that are within a specified range. The selected frames are then used in the motion estimation process to encode the current frame.

The present invention has various embodiments, including as a computer implemented process, as computer apparatuses, as integrated circuits, and as computer program products that execute on general or special purpose processors.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
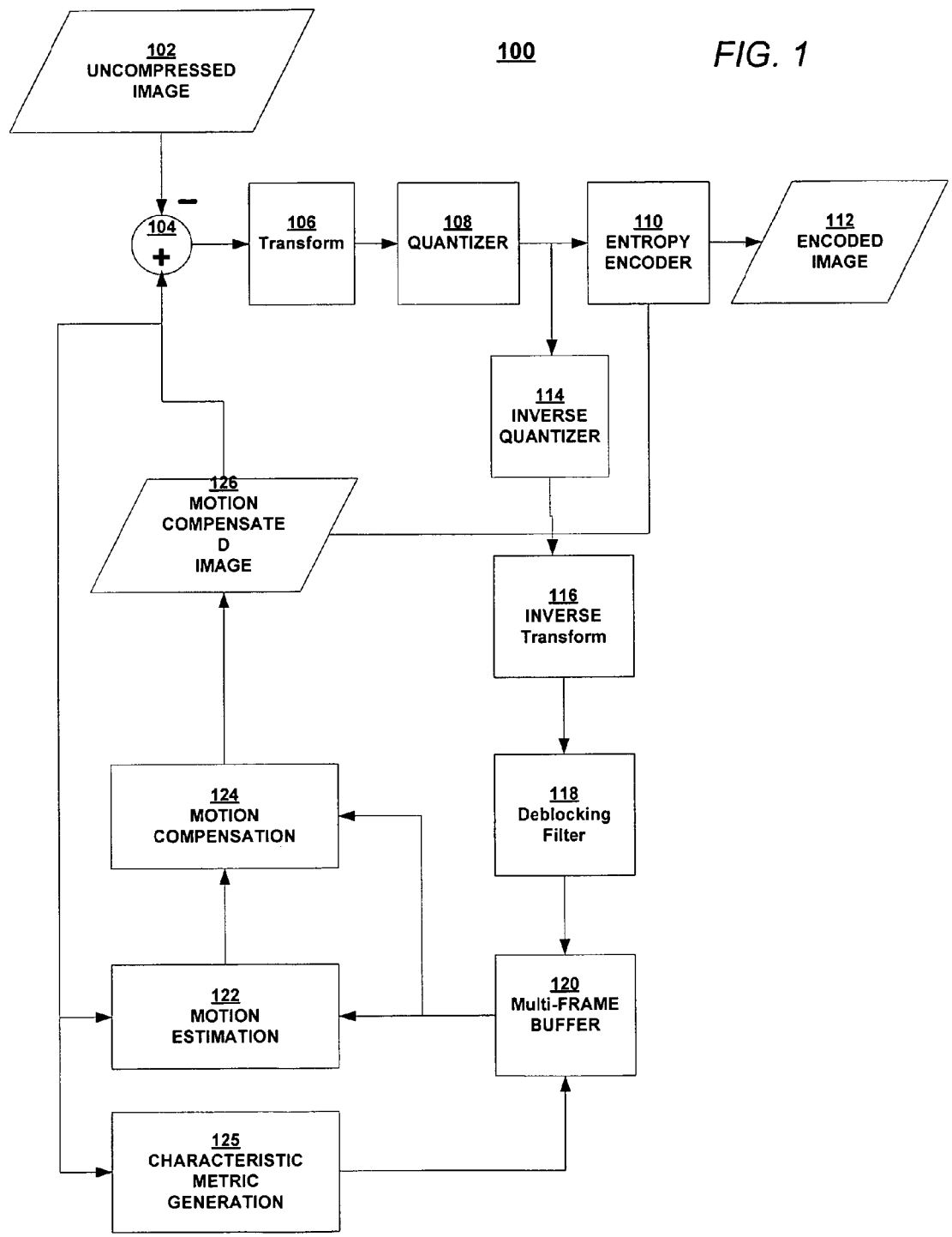
FIG. 1 is a block diagram of a hybrid video encoder according to one embodiment of the invention.

Referring now to FIG. 1, there is shown a block diagram of an encoder 100 according to one embodiment of the present invention. The encoder 100 can be implemented in hardware, software, or a combination thereof. The encoder 100 generally operates according to principles of an MPEG-4 Advanced Video Codec (ITU H.264) as described in ISO/IEC 14496-10 or similar hybrid Motion Compensation/Block-Transform encoder, with the additional features and structures as further described below. The encoder 100 is used to encode a video sequence that comprises a plurality of uncompressed images 102. The image 102 data comprises a plurality of macroblocks, each macroblock having 4:x:x sample format of luminance and chrominance data, depending on the implementation.

The type of image (equivalently "frame" or "picture" or "slice") will be one of an intra-frame (I), a forward predicted picture (P), or a bi-directional predicted picture (B). Intra-pictures (I-frames) are coded without reference to other frames contained in the video sequence. In older video compression standards such as MPEG-1 and MPEG-2, inter-frame predicted frames (P-frames) are coded with reference to the nearest previously coded I-frame or P-frame, usually incorporating motion compensation to increase coding efficiency. In H.264/MPEG-4 AVC, different blocks within a P-slice may refer to blocks in different, previously coded I-slice or P-slice. Bi-directionally predicted frames (B-frames) may use both past and future frames (or slices) as references.

The encoder 100 uses different encoding processes depending on the type of the image. P and B type frames are encoded as follows. The macroblocks of the image 102 are input into both subtractor 104 and motion estimator 122. The motion estimator 122 determines for each macroblock a motion vector, using either a Fast Motion Estimation (FME) algorithm or the Phase Correlation (PC) analysis as described in either of the related applications, incorporated by reference herein. The motion vector represents the horizontal and vertical displacement from the current macroblock being encoded to the matching macroblock in a reference frame in the frame buffer 120. When completed for all of the macroblocks in the current image 102, the result is a set of motion vectors, each motion vector associated with one macroblock in the current image. Each macroblock will be coded as either a forward predicted (P), backward predicted (B), weighted average predicted (W), intra (I), or skip (S) block, depending on the motion vector information for the block, if any, and the frame type. For a B-frame, motion predicted blocks will be either P or B blocks, depending on the reference picture used for the particular macroblock; otherwise, the blocks will be I or S blocks. For a P frame, the blocks will be either P, S, or I blocks. These motion vectors data and block information are passed to the motion compensation stage 124, which applies them to the reference image(s) to create a motion compensated image 126.

The motion compensated image 126 is then subtracted from the original image 102 by subtractor 104 to produce a residual signal for each macroblock. It is understood that in practice the residual generation 104 takes place on a macroblock by macroblock basis directly following motion compensation 124, as it is not necessary for motion compensated image 126 to be complete prior to being input into the subtractor 104. The residual signal represents the difference between the predicted (motion compensated) image and the original image 102 being encoded. In the case that the original image 102 is a B- or P-picture, the motion compensated image 126 is an estimation of the original image 102. In the case that the original image 102 is an I-picture, then the motion compensated image 126 will have all pixel values being equal to zero, and the residual signal will be the same as the original image 102. The residual signal is then input into transform stage 106, where it undergoes a transform and quantization 108 to generate quantized transform coefficients. These coefficients represent either transformed pixel values (for an I-frame) or the residual signal between the current block and a previously encoded block in the current frame. The quantized coefficients are used to reconstruct the frame as a potential reference image via inverse quantizer 114, inverse transform 116, and optionally a deblocking filter 118—unless the frame was encoded as a non-reference B-frame, in which case no reconstruction takes place. The reconstructed image is stored in a multi-frame buffer 120, that contains up to N reference frames R1 . . . Rn (where e.g., N≤16). The multi-frame buffer 120 then deletes one of the reference frames as will be described below.

In the context of the foregoing process, the present invention has three aspects. A first aspect of the invention is the characterization of frames for selection and maintenance in the frame buffer 120. A second aspect of the invention is the selection method by which frames of the video sequence are maintained in the frame buffer 120 for use by the motion estimator 122. A third aspect of the invention is how the motion estimator 122 selects one or more reference frames from the frame buffer 120 for encoding the current frame.

The general process of updating the reference frames in the frame buffer 120 is as follows. With regard to the first aspect of the invention, each input frame 102 is characterized by a characteristic metric generation stage 125 using a characterization metric. Various metrics can be calculated in both the spatial and frequency domains. The N frames that were used as reference frames in the previous iteration plus the current frame 102 constitute N+1 candidates for reference frames in the current iteration. From this set of N+1 candidate frames, N frames will be selected and maintained in the buffer 120. The selection process is implemented as the equivalent process in which one of the N+1 frames is deleted from the frame buffer 120. The selection of the N reference frames (or equivalently, the deletion of the N+1th frame) is made to obtain a desired degree of coverage or distribution of the reference frames with respect to the characteristic metric. In one embodiment, the objective is to select the N frames that are maximally different in terms of the characteristic metric. This objective is essentially the same as seeking to provide a maximum coverage or distribution of the reference frames with respect to the metric.

One advantage of converting a signal from the space (or time) domain to the frequency domain is information compaction: most of the information carried in the signal is contained in the DC and lower frequency AC components. Accordingly, in one embodiment, the characteristic metric generated by the characteristic generation stage 125 comprises the amplitude of the DC value and first k AC coefficients of the 2-D Fourier transform of the frame. In other embodiments, other functions are used for frame characterization metrics. These may include, are not restricted to, other transforms such as the 2-D Discrete Cosine Transform or low-complexity 2-D integer transforms, and various types of difference functions, such as the Displaced Frame Difference (DFD), which is a pixel by pixel difference between the luminance components of the two frames of interest (or a reduced resolution version of the two frames); differences in the histograms of the two frames (luminance and chrominance) or differences in space or frequency domain statistics (such as variance of luminance, etc.).

For a given frame f, the characteristic metric $CM_f$ would be:

$$CM_f = (x_{f,1}, x_{f,2}, \ldots, x_{f,D})^T$$

where D=k+1. These characteristic metric values can be represented in a characteristic vector of D dimensions. The description herein of the characteristic metric as a vector of values is for convenience only, and those of skill in the art understand that the characteristic metric values can be stored in any type of logical or physical data structure suitable to the application.

Figure 2:
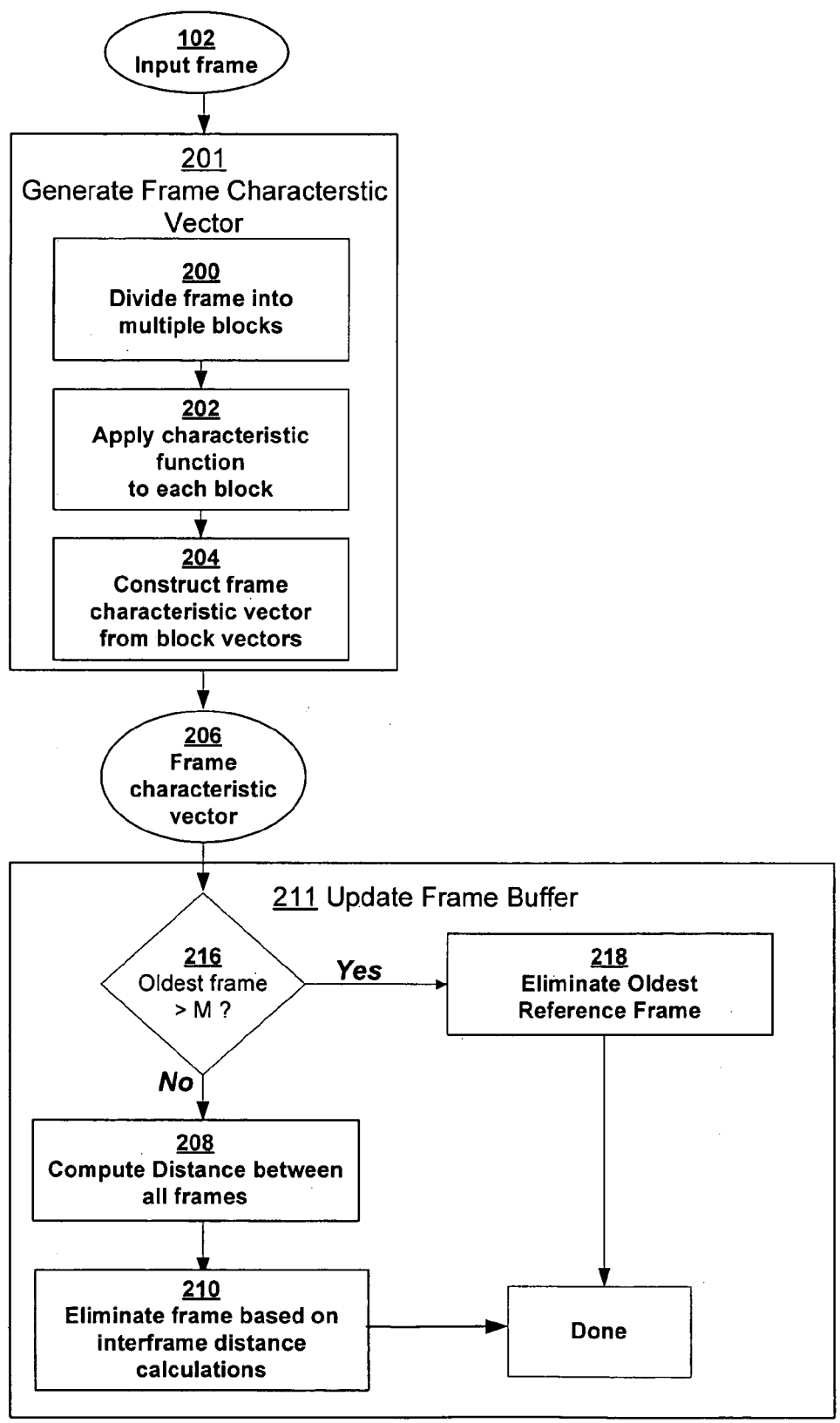
FIG. 2 is a flowchart of a method of applying a transform to a frame for generating a frame characteristic vector, selecting a reference frame using such vector, updating a frame buffer, according to one embodiment of the invention.

Referring now to FIG. 2 there is shown a method of applying a transform to a frame for generating a frame characteristic vector, selecting a reference frame using such vector, and updating the reference buffer 120, according to the first and second aspects of the invention. As indicated previously a frame characteristic vector is generated 201 for the input frame using a transform function. There are a number of different ways in which the frame characteristic vector can be generated 201.

In the embodiment illustrated in FIG. 2, the current frame is partitioned 200 into a number of blocks. The characteristic transform is applied 202 to each of these blocks independently, to produce a block characteristic vector for each block. The partitioning and generation stages can be done sequentially or in a parallel for some or all of the blocks.

The frame characteristic vector 206 is then constructed 204 using the DC coefficient and first k AC coefficients of each block. If the frame is divided into B blocks, the vector will have D=B*(k+1) dimensions. The construction of the frame characteristic vector 206 can be done in various ways, including concatenation of the block characteristic vectors. A concatenated frame characteristic vector has the following form:

$$CM_f = (x_{f,1}, \ldots x_{f,B}, x_{f,B+1}, \ldots, x_{f,D})^T$$

In one embodiment, the frame characteristic vector 206 is constructed 204 from the block characteristic vectors by reordering and concatenating the components of the block characteristic vectors. The reordering step groups the like components of the vectors together, beginning with the most significant components (e.g., the DC coefficient), and proceeding to the least significant components (e.g., the $k^{th}$ AC coefficients).

Thus, where there are B blocks in a frame and the transform is the Fourier transform, the first B components of the frame characteristic vector are the DC coefficients of the B blocks, and the remaining components are the k AC coefficients from each block, grouped by the coefficient order. For example, if the frame is divided into 12 blocks, and if k=2, then the frame characteristic vector will have 36 components, in three groups of 12.

The block-based Fourier transform approach to constructing the frame characteristic vector is useful when practiced in conjunction with the phase correlation based motion estimation methods described in the related applications, since these methods include partitioning the current image into phase correlation blocks, and applying a Fourier transform operation to the blocks. Thus, a further embodiment of the present invention re-uses as the block characteristic vector the coefficients from a transform that has been previously generated during the encoding process, and which are thereby available in memory to construct the frame characteristic vector.

Alternatively, the characteristic transform may be applied to the entire frame. In one embodiment, to reduce the complexity of generating the frame characteristic vector for the entire frame, the current frame is first down-sampled either during or before the characteristic metric generation stage 125 to smaller size (e.g., 2:1, or 4:1), before the characteristic metric vector is generated. This approach of subsampling of the frame may also be applied at the block level.

Once a frame characteristic vector 206 has been generated 201, the next stage of operation is to select which N reference frames will be kept in the frame buffer for the next encoding iteration. Again, the selection of N reference frames from N+1 frames is equivalently implemented by deletion of one of the frames. FIG. 2 illustrates one method for selecting 211 the N reference frames maintained in the frame buffer 120. It should be noted that the generation and selection stages can operate independently and asynchronously. The selection 211 operation can be implemented by a selection module or equivalent selection circuit, which can be part of the logic or structure of the characteristic metric generation stage 125 of the frame buffer 120, either of which would be examples of suitable means for selecting reference frames for maintaining in the frame buffer.

In operation, the frame buffer 120 starts out empty, and thus for the first N+1 frames in a video sequence to be encoded, all previous frames are used as reference frames. For purposes of simplicity, previously encoded B-frames are not used as reference frames. Starting with frame number N+2 and continuing with each frame until the end of the sequence, N of the previously N+1 encoded frames are kept in the buffer 120 as potential reference frames, and one of the N+1 frames is deleted. The decision as to which of these N frames are kept may be made in a number of different ways, depending on the implementation requirements.

Generally, the selection of the N frames for use as reference frames in the buffer 120 is based on obtaining a specified type of distribution of the reference frames over the value space of the characteristic metric. The specified type of distribution can be one that maximizes distribution of the reference frames with respect to the characteristic metric, that constrains the distribution in a particular way, or that achieves any specific distribution according to an independent measure.

As described above, in one embodiment, the N frames are selected so as to maximally distribute the frame characteristic vectors in their vector space. Given that each frame may be considered having a location in the vector space as described by the frame's characteristic vector, a distance between each pair of frames can be determined. This distance is called the interframe distance. One embodiment then is to select the N reference frames that have the greatest sum total interframe distance.

One embodiment of this maximization goal is to obtain the maximum sum of the square of Euclidean distances among N characteristic vectors. Here, the interframe distance is computed 208 as the pair-wise square of the Euclidean distances between the N+1 candidate frames. The pair-wise square of the Euclidean distance between frame i and frame j (call it $_{i,j}$) is:

$$\Delta_{i,j} = \sum_{n=1}^{D} (x_{i,n} - x_{j,n})^2 \quad (1)$$

Then, the sum (call it $_T$) of the interframe distances $_{i,j}$ for each possible set of N candidate reference frames is calculated 208. Where there are N+1 candidate frames, there are N such total sums $_T$. The set of N frames that leads to the highest sum $_T$ is selected 210 and retained in the buffer 120. The remaining frame that is not part of that set is deleted. This approach to selecting the reference frames results in finding the N frames that are most 'spread out' in a D-dimensional space of the characteristic metric, and thus provides the maximal coverage of the vector space.

The selection of reference frames with maximal distribution with respect to the characteristic metric is advantageous for several following reasons. If the N frames belong to different shots, the frames will have a large difference between them. This will lead to improved compression in sequences that involve multiple, repetitive scenes. If the sequence primarily comprises a single scene (as in a talking head application), this approach will still be beneficial, as it will attempt to select the frames that are most disparate—and hence maximize the chance of capturing both a frame when an object is completely occluded and one in which it is completely visible.

In order to ensure that the reference frames in the frame buffer 120 are sufficiently similar to the current frame to be useful potential frames for reference, it is beneficial to periodically cull one or more frames from the frame buffer 120. Culling frames prevents unintentionally preserving reference frames from shots that are not similar to any other shots in the future, and hence are useless as predictors. In some embodiment, the encoder periodically performs what is known as a Decoder Refresh (DR) operation. This operation consists of emptying the reference frame buffers and encoding the current frame or slice in INTRA mode. From this point on, no reference frame prior to the DR point is available to be used. Thus, 'stale' reference frames are automatically discarded. The DR period varies depending on the application, and can typically range from a few seconds to thirty or more seconds.

In other embodiments, the DR operation is not used, and a different culling operation provided. Here, the 'age' of the reference frame is the amount of time since it was first included in the reference buffer 120, and a maximum limit of M seconds is set for this period of time. Referring again to FIG. 2, prior to determining the distances between frames, the age of the oldest reference frame is compared 216 to M. If the oldest reference frame has been in the frame buffer 120 for more than M seconds, then it is discarded 218, thereby leaving N reference frames in the frame buffer 120. Otherwise, the algorithm proceeds with selecting the N reference frames for the buffer 120.

A further embodiment of the reference selection process 211 includes weighting one or more of the components of the characteristic vector in order to increase or decrease the influence of such component in the distance computation. In one implementation, a weight is applied to certain coefficients of the vector components in the calculations of the interframe distances. In an embodiment in which the characteristic vector is based on frequency transforms, the weight can either increase or decrease the contribution of the DC component to the interframe distance, depending on the application. Thus, the weight can be greater than 1 to upscale the DC coefficient, since this coefficient carries more information about the frame than the AC coefficients. On the other hand, if there is only a change in illumination and no real motion, the DC component will change, even though the two frames are practically identical. For this reason the weight can be less than 1, in order to downscale the DC coefficient. Thus, equation (1) would be modified as follows:

$$\Delta_{i,j} = \alpha \sum_{n=1}^{B} (x_{i,n} - x_{j,n})^2 + \sum_{n=B+1}^{D} (x_{i,n} - x_{j,n})^2 \quad (2)$$

The parameter is the weight to give more or less weight to the DC coefficients. In one embodiment, the weight is adjusted in response to the motion estimation 122 stage. For example, where phase correlation is used during motion estimation, it is generally insensitive to changes in illumination, and thus able to distinguish actual motion from such illumination changes. Accordingly, one embodiment uses the phase correlation information to control the value of the weight for the DC coefficient.

In the example provided above with a 36-dimensional frame characteristic vector using a Euclidean interframe distance, the calculation of each Euclidean distance requires one square root, 35 sums and 36 multiplications. There will be 15 pair-wise Euclidean distances if N=5. Each sum of Euclidean distances adds 9 additions (although many of these are the same and can be re-used for each of the 6 sums of Euclidean distances). The number of calculations would increase significantly for larger values of N and higher dimensional vectors. To avoid recalculating all pair-wise Euclidean distances every time a new frame is encoded, the values of these distances can be stored until one of the pertinent frames is deleted from the frame buffer 120.

Figure 3:
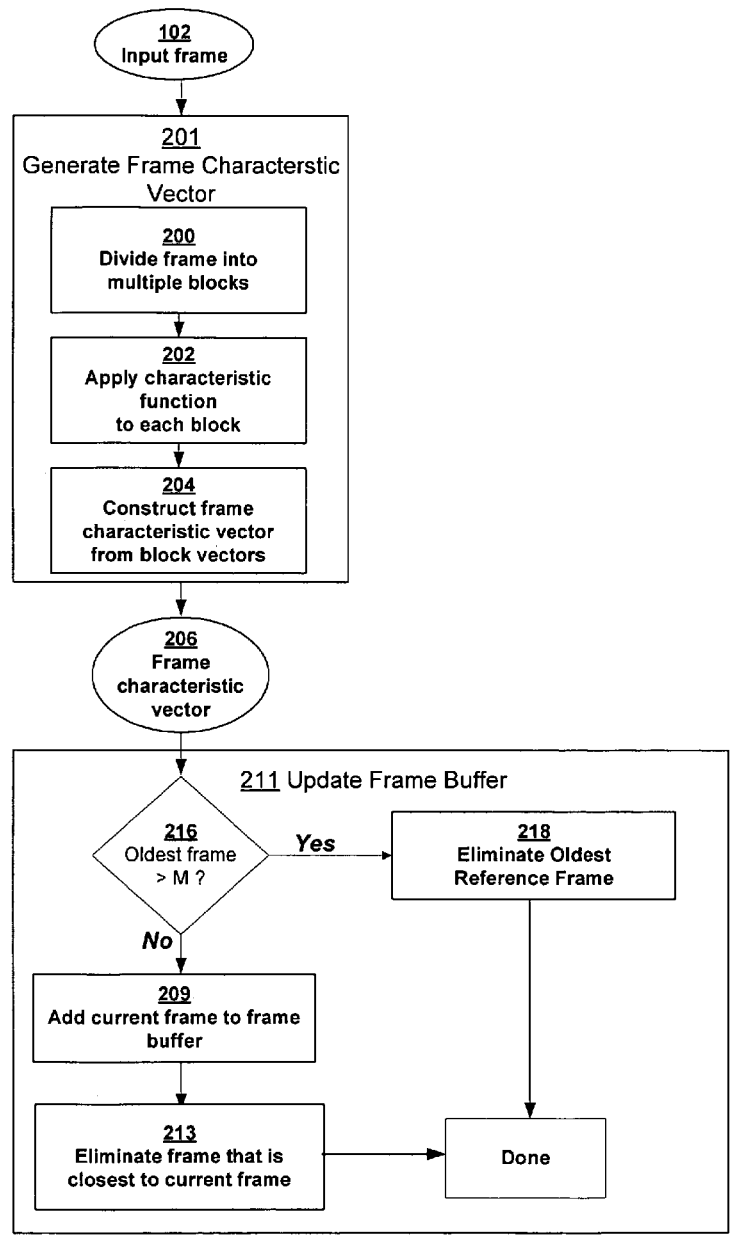
FIG. 3 is a flowchart of another embodiment of a method for selecting reference frames for the frame buffer.

Alternatively, another embodiment of the frame selection process 211 is to automatically include the current frame in the frame buffer 120 as one of the candidate reference references. FIG. 3 illustrates this embodiment. Here, the automatic selection 209 of the current frame (which will become the immediately previous frame in the next iteration) reduces the frame selection process 211 to discarding 213 the candidate reference frame (from the remaining N candidates) that is closest in distance to the current frame (since this closest frame provides the least amount of variation in content). In this embodiment, the distance between the current frame and each of the N frames that are presently in the frame buffer 120 from the previous iteration is calculated, and then compared (e.g., sorted) to find the reference frame that has lowest interframe distance to the current frame. This frame is discarded, and the current frame is added to the frame buffer 120. Only N distances therefore need to be calculated in each iteration and these values need not be stored for use in the next iteration.

A further optional embodiment to the frame selection process 211 is to adapt it to the content of the video sequence: for panning sequences, the last M (e.g., 5) frames (instead of just the last frame) can automatically be included in the frame buffer 120 as reference frames, and the remaining N−(M+1) frames are then selected by any of the above selection methods. In other words, the balance between 'short-term' reference frames (those immediately preceding the current frame) and 'long-term' reference frames can be adjusted towards the former in the case of panning sequences. Panning can be detected, for example, by the correlation of the magnitude and direction of motion vectors over a number of consecutive frames.

A third aspect of the invention is the selection of which reference frame(s) in the frame buffer 120 to use for motion estimation on the current frame 102. A challenge posed in long term prediction for encoding is to perform efficient motion estimation once the encoder has settled on which frames to use as reference. Conventional approaches use a brute force approach whereby they perform motion estimation with respect to every reference frame and pick whichever gives the best result in terms of minimizing the Sum of Absolute Differences (SAD) or Sum of Squared Differences (SSD). Because this approach involves a comparison to every reference frame, it is expensive in terms of CPU cycle usage, particularly if a full search of each frame, rather than FME, algorithm is used.

Figure 4:
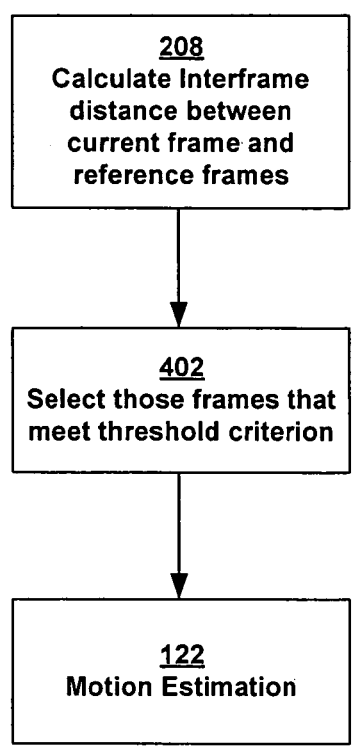
FIG. 4 is a flowchart of a motion estimation process, according to one embodiment of the invention.

In accordance with the third aspect of the present invention, the motion estimation process can be accelerated for multiple reference frames in the frame buffer 120. FIG. 4 illustrates this general process, which can be implemented as part of the logic or structure of the motion estimator 122, or in separate selection circuit or module. Any of these implementations are examples of suitable means for selecting reference frames for encoding a current frame.

Generally, the motion estimation process 122 is applied to those reference frames for which the interframe distance between that reference frame and the current frame to be encoded is below 402 a certain threshold—i.e. $_{curr,j}$<T. The value of the threshold T depends on the dimension (D) of the vector as well as the type of metric used, and the time constraints for encoding. In one embodiment, the interframe distance between the two frames is divided by B, the number of blocks (e.g., phase correlation blocks), before comparison to the threshold T. This gives an average interblock difference between corresponding blocks of the current frame and the candidate reference frame. This ensures that the algorithm is independent of the image resolution as well as the size of blocks.

This aspect of the invention is particularly useful in real-time video encoding scenarios (e.g., videoconferencing), where CPU constraints may prevent the encoder from searching through all of the available reference frames. Suppose, for instance, that there are six reference frames but due to CPU limitations, motion estimation can be performed for at most two reference frames. Here, the motion estimator 122 applies the interframe distance threshold to the frame characteristic vector for each of the reference frames. Suppose furthermore that four of the six reference frames meet the threshold criterion of being within a threshold interframe distance. In this situation, the motion estimator 122 selects 402 the two frames with the lowest interframe distance. In one embodiment where only a limited number of frames can be selected for motion estimation, the motion estimator 122 selects the immediately prior encoded frame (as long as it meets the threshold criterion) and the remaining frame (or frames) would be those with the lowest interframe distance (distances). One benefit of the foregoing method is that it allows each macroblock to independently use whichever reference frame is most appropriate.

Figure 5:
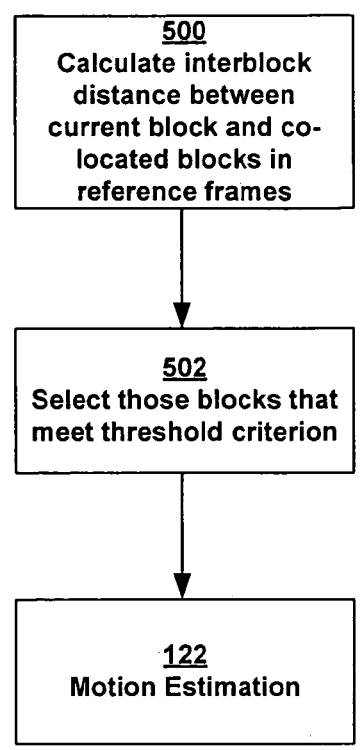
FIG. 5 is a flowchart of another embodiment of a motion estimation process.

Another embodiment for the selection process is illustrated in FIG. 5. Here, the approach is to calculate 500 the interblock distance between each block in the current frame and the co-located blocks in each of the reference frames, using the block characteristic vector as the characteristic metric. Again, the blocks here can be the phase correlations blocks or other blocks. Motion estimation 122 will only be performed for those blocks in the reference frames that are within 302 a threshold distance to the block of interest in the current frame. The threshold difference here is different from the previously described threshold T, as this distance is based entirely on block, not frame distances. One result of this thresholding test is that all macroblocks belonging to the same phase correlation block will use the same subset of reference frames for motion estimation, but this is a reasonable restriction given the performance advantages.

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are the means used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for maintaining a set of reference frames in a frame buffer in a video encoding system, the method comprising:
    generating a characteristic metric vector for a current frame to be encoded and for each reference frame in the frame buffer, the characteristic metric vector in a vector space; and
    selecting from the reference frames and the current frame, a plurality of frames for maintaining in the frame buffer for which the characteristic metric vectors of the frames have specified type of coverage of the vector space, wherein at least one frame of the plurality of frames has at least one motion vector.

2. The method of claim 1, wherein selecting a plurality of frames comprises deleting a frame from the frame buffer.

3. The method of claim 1, wherein generating a characteristic metric vector comprises applying a transform to a frame.

4. The method of claim 3, wherein the transform is a Fourier Transform.

5. The method of claim 3, wherein the transform is a Discrete Cosine Transform.

6. The method of claim 3, wherein the transform is an integer transform.

7. The method of claim 3, wherein the transform is a function of at least one of a luminance, a chrominance, or a domain statistic of luminance or chrominance of a frame.

8. The method of claim 1, wherein generating a characteristic metric vector for a frame comprises:
    partitioning the frame into a plurality of blocks;
    generating a characteristic metric vector for each block; and
    generating the characteristic metric vector for the frame from the characteristic metric vector for each of the plurality of blocks.

9. The method of claim 8, further comprising:
    subsampling each block of the frame into a subsampled block prior to generating the characteristic metric vector for the block.

10. The method of claim 1, wherein generating a characteristic metric vector for a frame comprises:
    partitioning the frame into a plurality of blocks;
    generating a characteristic metric vector for each block; and combining the characteristic metric vector for each of the plurality of blocks into a single characteristic metric vector for the frame.

11. The method of claim 1, wherein generating a characteristic metric vector for a frame comprises:
   partitioning the frame into a plurality of blocks;
   generating a characteristic metric vector for each block, each characteristic metric vector having a plurality of components; and
   grouping like components of the characteristic metric vectors of the blocks together; and
   concatenating the grouped components together in order of significance of the grouped components.

12. The method of claim 1, wherein generating a characteristic metric vector for a frame comprises:
   partitioning the frame into a plurality of blocks;
   generating a characteristic metric vector for each block by applying a frequency transform to each block to generate a plurality of coefficients, each characteristic metric vector having the plurality of coefficients as vector components, the coefficients including a DC coefficients and a plurality of AC coefficients; and
   grouping the DC coefficients of the characteristic metric vectors of the blocks together into a first group of DC vector components; and
   grouping the AC coefficients of the characteristic metric vector of the blocks together into a plurality of AC components groups, according to the coefficient order; and
   concatenating the coefficient groups by concatenating the DC vector components, followed by the AC component groups.

13. The method of claim 1, wherein generating a characteristic metric vector for a frame comprises:
   partitioning the frame into a plurality of blocks, each block comprising a phase correlation block including plurality of macroblocks of the frame;
   generating a characteristic metric vector for each block by applying a frequency transform to the phase correlation block; and
   combining the characteristic metric vector for each of the plurality of phase correlation blocks into a single characteristic metric vector for the frame.

14. The method of claim 1, wherein generating a characteristic metric vector for a frame comprises:
   reusing as the characteristic metric vector a plurality of transform coefficients previously generated for the frame during motion estimation in the video encoding system.

15. The method of claim 1, wherein generating a characteristic metric vector for a frame comprises:
   subsampling a frame to obtain a subsampled frame; and
   applying a transform to the subsampled frame.

16. The method of claim 1, wherein selecting from the reference frames and the current frame, a plurality of frames for maintaining in the frame buffer for which the characteristic metric vectors of the frames have specified type of coverage of the vector space comprises:
   selecting the frames for the reference buffer that maximally distribute the characteristic metric vectors of the selected frames in the vector space.

17. The method of claim 16, wherein the reference frames in the frame buffer and the current frame comprise N+1 candidate reference frames, and wherein selecting the frames for the reference buffer that maximally distribute the characteristic metric vectors of the selected frames in the vector space comprises:
   determining for each pair of candidate reference frames an interframe distance using the characteristic metric vectors of the candidate reference frames; and
   selecting the set of N candidate reference frames that have a maximum total interframe distance between the pairs in the selected set.

18. The method of claim 17, wherein determining an interframe distance comprises:
   determining a Euclidean distance between the characteristic metric vectors for the pair of candidate reference frames.

19. The method of claim 17, wherein the characteristic metric vector have a plurality of vector components, further comprising:
   weighting at least one vector component prior to determining the interframe distance.

20. The method of claim 17, wherein the characteristic metric vector is generated from a frequency transform on the frame and has a plurality of vector components including a DC component and a plurality of AC components, further comprising:
   weighting the DC component prior to determining the interframe distance.

21. The method of claim 17, wherein the characteristic metric vector is generated from a frequency transform on the frame and has a plurality of vector components including a DC component and a plurality of AC components, further comprising:
   responsive to motion between the current frame and a previous frame, up-weighting the DC component prior to determining the interframe distance; and
   responsive to a change in illumination between the current frame and a previous frame, downweighting the DC component prior to determining the interframe distance.

22. The method of claim 17, wherein the characteristic metric vector has a plurality of components, including a most significant component, further comprising:
   responsive to motion between the current frame and a previous frame, up-weighting the most significant component prior to determining the interframe distance; and
   responsive to a change in illumination between the current frame and a previous frame, downweighting the most significant component prior to determining the interframe distance.

23. The method of claim 1, further comprising:
   deleting all reference frames in the frame buffer.

24. The method of claim 1, wherein the reference frames in the frame buffer and the current frame comprise N+1 candidate reference frames, and selecting from the reference frames and the current frame, a plurality of frames for maintaining in the frame buffer further comprises:
   determining an age of oldest reference frame in the frame buffer;
   responsive to the age of the oldest reference frame exceeding a maximum age, deleting the oldest reference frame from the frame buffer, to result in N−1 reference frames in the frame buffer, and selecting the N−1 reference frames and the current frame; and
   responsive to the age of the oldest reference frame not exceeding a maximum age:
      determining for each pair of candidate reference frames an interframe distance; and
      selecting the set of N candidate reference frames that have a maximum total interframe distance between the pairs in the selected set.

25. The method of claim 1, wherein the reference frames in the frame buffer and the current frame comprise N+1 candidate reference frames, and selecting from the reference frames and the current frame, a plurality of frames for maintaining in the frame buffer further comprises:
- determining a reference frame in the frame buffer that has a characteristic metric vector closest to the characteristic metric vector of the current frame;
- deleting the determined closest reference frame from the frame buffer; and
- storing the current frame in the frame buffer as a reference frame.

26. The method of claim 25, wherein determining a reference frame in the frame buffer that has a characteristic metric vector closest to the characteristic metric vector of the current frame comprises:
- determining an interframe distance between the current frame and each reference frames in the frame buffer, based on the characteristic metric vectors of the current frame and each of the reference frames; and
- selecting the closest reference frame as the reference frame having the least interframe distance to the current frame.

27. The method of claim 1, wherein the reference frames in the frame buffer and the current frame comprise N+1 candidate reference frames, and selecting from the reference frames and the current frame, a plurality of frames for maintaining in the frame buffer further comprises:
- detecting panning over a plurality of consecutive frames including the current frame and previous frames;
- responsive to the panning, selecting the current frame and M consecutive frames previous to the current frame;
- selecting N−(M+1) of reference frames from the reference buffer that maximally distribute the characteristic metric vectors of the selected frames in the vector space; and
- storing the selected N−(M+1) reference frames, the current frame, and the M consecutive frames in the frame buffer.

28. The method of claim 1, wherein selecting from the reference frames and the current frame, a plurality of frames for maintaining in the frame buffer further comprises:
- detecting panning over a plurality of consecutive frames including the current frame and previous frames;
- responsive to the panning, selecting the current frame and M consecutive frames previous to the current frame responsive to not panning, selecting the current frame and Q consecutive frame previous to the current frame, where M>Q≥0;
- selecting a remaining number of reference frames from the reference buffer that maximally distribute the characteristic metric vectors of the selected frames in the vector space; and
- storing the selected reference frames, the current frame, and any selected consecutive frames in the frame buffer.

29. A method for selecting reference frames for encoding a current frame in a video encoding system, where the number of reference frames is limited, the method comprising:
- storing in a frame buffer a plurality of reference frames, each reference frame associated with a characteristic metric vector, the characteristic metric vector in a vector space, wherein at least one frame of the plurality of frames has at least one motion vector;
- generating for the current frame a characteristic metric vector;
- selecting for encoding the current frame an immediately prior encoded frame; and
- selecting for encoding the current frame at least one reference frame from the frame buffer having a characteristic metric vector that is closest to the characteristic metric vector of the current frame.

30. The method of claim 29, wherein selecting for encoding the current frame an immediately prior encoded frame comprises selecting the immediately prior encoded frame only if a characteristic metric vector of the immediately prior encoded frame is within a threshold distance of the characteristic metric vector of the current frame.

31. A circuit for maintaining a set of reference frames in a video encoding system, the circuit comprising:
- a frame buffer for storing a plurality of reference frames;
- a characteristic metric vector generation circuit adapted to receive a frame, generate from the frame a characteristic metric vector in a vector space, and provide the frame and characteristic metric vector to the frame buffer for storage; and
- a selection circuit coupled to the frame buffer and adapted to select for maintaining in the frame buffer a plurality of frames for which the characteristic metric vectors of the frames have specified type of coverage of the vector space, wherein at least one frame of the plurality of frames has at least one motion vector.

32. The selection circuit of claim 31, wherein the selection circuit is adapted to select a plurality of frames by deleting a frame from the frame buffer.

33. The characteristic metric vector circuit of claim 31, wherein the characteristic metric vector generation circuit generates a characteristic metric vector by applying a transform to a frame.

34. An apparatus for maintaining a set of reference frames in a frame buffer in a video encoding system, the apparatus comprising:
- means for generating a characteristic metric vector for a current frame to be encoded and for each reference frame in the frame buffer, the characteristic metric vector in a vector space; and
- means for selecting from the reference frames and the current frame, a plurality of frames for maintaining in the frame buffer for which the characteristic metric vectors of the frames have specified type of coverage of the vector space, wherein at least one frame of the plurality of frames has at least one motion vector.

35. A computer program product, for maintaining a set of reference frames in a video encoding system, the circuit comprising:
- a computer readable medium storing computer executable instructions;
- a frame buffer for storing a plurality of reference frames;
- a characteristic metric vector generation module stored on the computer readable medium and executable by a processor to receive a frame, generate from the frame a characteristic metric vector in a vector space, and provide the frame and characteristic metric vector to the frame buffer for storage; and
- a motion estimation module stored on the computer readable medium and executable by a processor to select for maintaining in the frame buffer a plurality of frames for which the characteristic metric vectors of the frames have specified type of coverage of the vector space, wherein at least one frame of the plurality of frames has at least one motion vector.

* * * * *